US011645861B2

(12) United States Patent
Heift et al.

(10) Patent No.: US 11,645,861 B2
(45) Date of Patent: May 9, 2023

(54) METHODS AND SYSTEM FOR OCCUPANCY CLASS PREDICTION AND OCCLUSION VALUE DETERMINATION

(71) Applicant: Aptiv Technologies Limited, St. Michael (BB)

(72) Inventors: Monika Heift, Schwelm (DE); Klaus Friedrichs, Dortmund (DE); Xuebing Zhang, Wuppertal (DE); Markus Bühren, Erkrath (DE); Alexander Barth, Wermelskirchen (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/816,068

(22) Filed: Jul. 29, 2022

(65) Prior Publication Data

US 2023/0034624 A1 Feb. 2, 2023

(30) Foreign Application Priority Data

Jul. 29, 2021 (EP) ..................................... 21188547

(51) Int. Cl.
*G06V 40/10* (2022.01)
*G06V 10/26* (2022.01)
*G06V 20/00* (2022.01)

(52) U.S. Cl.
CPC ............ *G06V 40/103* (2022.01); *G06V 10/26* (2022.01); *G06V 20/36* (2022.01)

(58) Field of Classification Search
CPC ....... G06V 40/103; G06V 10/26; G06V 20/36
See application file for complete search history.

(56) References Cited

U.S. PATENT DOCUMENTS

| 8,195,356 | B2 | 6/2012 | Allen |
| 8,581,983 | B2 | 11/2013 | Shi et al. |
| 9,751,210 | B2 | 9/2017 | Fong et al. |
| 10,583,828 | B1 * | 3/2020 | Han ........................ G08G 1/168 |

(Continued)

FOREIGN PATENT DOCUMENTS

WO 2008106804 9/2008

OTHER PUBLICATIONS

"Extended European Search Report", EP Application No. 21188547.0, dated Jan. 21, 2022, 10 pages.

(Continued)

*Primary Examiner* — Ming Y Hon
(74) *Attorney, Agent, or Firm* — Colby Nipper PLLC

(57) ABSTRACT

The present disclosure describes a method for occupancy class prediction, such as for occupancy class detection in a vehicle. In aspects, the method includes determining, for a plurality of points of time, measurement data related to an area and determining, for a plurality of points of time, occlusion values based on the measurement data. The method further includes selecting, for a present point of time, one of a plurality of modes for occupancy class prediction based on the occlusion values for at least one of the present point of time and a previous point of time and/or based on one of the plurality of modes for occupancy class prediction selected for the previous point of time. The method additionally includes determining, for the present point of time, one of a plurality of predetermined occupancy classes of the area based on the selected mode for the present point of time.

20 Claims, 8 Drawing Sheets

(56) References Cited

U.S. PATENT DOCUMENTS

| | | | | |
|---|---|---|---|---|
| 10,635,917 | B1* | 4/2020 | Kim | G06N 3/0454 |
| 10,953,850 | B1 | 3/2021 | Pertsel et al. | |
| 2015/0324653 | A1* | 11/2015 | Xu | G06V 20/593 |
| | | | | 348/148 |
| 2017/0008455 | A1* | 1/2017 | Goudy | G08G 1/097 |
| 2017/0140253 | A1* | 5/2017 | Wshah | G06N 3/08 |
| 2017/0161633 | A1* | 6/2017 | Clinchant | G06N 5/02 |
| 2018/0253627 | A1* | 9/2018 | Baradel | G06K 9/6271 |
| 2020/0226403 | A1* | 7/2020 | Evans | H04N 5/23229 |
| 2020/0339149 | A1* | 10/2020 | Darnaud | B60W 40/08 |
| 2022/0129666 | A1* | 4/2022 | Cherian | G06K 9/6267 |
| 2022/0294244 | A1* | 9/2022 | Helm | H02J 7/007194 |

OTHER PUBLICATIONS

Alefs, et al., "Robust Occupancy Detection from Stereo Images", Oct. 2004, 6 pages.

Selvaraju, et al., "Grad-CAM: Visual Explanations from Deep Networks via Gradient-based Localization", Mar. 21, 2017, 24 pages.

* cited by examiner

METHODS AND SYSTEM FOR OCCUPANCY CLASS PREDICTION AND OCCLUSION VALUE DETERMINATION

INCORPORATION BY REFERENCE

This application claims priority to European Patent Application Number EP21188547.0, filed Jul. 29, 2021, the disclosure of which is incorporated by reference in its entirety.

BACKGROUND

Digital imaging devices, such as digital cameras, are used in automotive applications to monitor the interior of a vehicle. Interior sensing applications are of great importance for the modern automotive industry and are expected to gain further popularity with increased focus on driver assistance systems and self-driving cars. Cabin view cameras for example may be able to replace traditional sensors (for example, for the seat belt alert function, air bag control or hands-off wheel detection) and may offer a wide range of additional possibilities.

However, it could frequently happen during normal driving scenarios, that the way between a region and a camera may be occluded even for a longer period of time. This may lead to inaccurate observing results from the camera or an observation of the region may be impossible at all. It is therefore desirable for the system to react to longer lasting occlusions and to make seat occupancy classification more reliable.

Accordingly, there is a need for methods and systems for occupancy class prediction and occlusion value determination that lead to reliable and accurate results.

SUMMARY

The present disclosure provides a computer-implemented method, a computer system, and a non-transitory computer readable medium according to the independent claims. Example embodiments are given in subclaims, the Description, and the Drawings.

In one aspect, the present disclosure may be directed at a computer-implemented method for occupancy class prediction, such as for occupancy class detection in a vehicle, wherein the method comprises the following steps performed (in other words: carried out) by computer hardware components: determining for a plurality of points of time measurement data related to an area; determining for a plurality of points of time occlusion values based on the measurement data; selecting for a present point of time one of a plurality of modes for occupancy class prediction based on the occlusion values for at least one of the present point of time and a previous point of time and/or based on one of the plurality of modes for occupancy class prediction selected for the previous point of time; and determining, for the present point of time, one of a plurality of predetermined occupancy classes of the area based on the selected mode for the present point of time.

In other words, based on the measurement data of an area, occlusion values of the area may be determined. Based on the occlusion values for at least one of the present points of time and a previous point of time, one of a plurality of modes for a present point of time may be selected. The one of a plurality of modes for a present point of time may also be selected based on the selected one of the plurality of modes for the previous point of time or based on a combination of the occlusion values and the selected one of a plurality of modes for the previous point of time. An occupancy class prediction of the area may be determined based on the selected mode for the present point of time. For the occupancy class prediction, a plurality of predetermined occupancy classes of the area may be determined.

The area may be an environment around a sensor, like a camera, a radar sensor or a light detection and ranging (LIDAR) sensor. The area may be of variable size and/or the area may comprise the interior of a vehicle, a car, a truck or the like. The area may be a specific area (or sector) which may comprise a specific region of interest, for example a seat region of a car (like a single seat or a seat bench).

The occlusion values may describe how relevant an occlusion may be to determine an occupancy class of the area as described herein. The occlusion may be a line-of-sight obstruction of the sensor, in other words the sensor may not be able to detect if or if not the area may be occupied. Different kinds of obstacles may lead to the occlusion, for example body parts of an occupant, objects or disturbances of the sensor (like contamination, fracture of a camera lens, dust, smoke or fog). The occupancy class may be a classification of different kinds of occupancy conditions. An occupancy condition may be, for example if a seat or a seat region of a passenger car is occupied, if a seat or a seat region of a passenger car is not occupied. According to various embodiments, two or more occupancy conditions may be combined into a common class (e.g., a combined class may include an occupancy condition where a seat or a seat region of a passenger car is not occupied (in other words: an empty seat) and an occupancy condition where the seat or the seat region of the passenger car is occupied by an object).

The selected mode for the present point of time, which may be based on at least the occlusion values for at least one of the present points of time and a previous point of time and which may be used for the occupancy class prediction, may define a condition that specifies the occlusion. The selected mode may also determine (or set, or select, or indicate) an action for the occupancy class determination. There may be a plurality of modes, in particular a first mode, a second mode, a third mode and/or a fourth mode (which may also be referred to as last mode) as described herein.

The plurality of predetermined occupancy classes may describe different occupancy states, for example a child seat, a person, an object or an empty seat as described herein. One of the plurality of occupancy classes or occupancy states may specify what kind of occupancy may be present in the area.

According to an embodiment, the plurality of modes comprises a first mode, a second mode, a third mode and a last mode, wherein the first mode is selected if the area is fully visible or slightly occluded, the second mode is selected if there is a short-time critical occlusion in the area, the third mode is selected if there is a longer lasting critical occlusion in the area, and the last mode is selected if there is a longer lasting critical occlusion in the area and a stable state of one of the plurality of predetermined occupancy classes is not reached.

According to an embodiment, in the first mode a change from a occupancy class for the present point of time to a different occupancy class of one of the plurality of predetermined occupancy classes may be based on a time fused occupancy class prediction.

The first mode may be a current mode for the occupancy class prediction if the area is fully visible or only slightly occluded. The area may be fully visible if there is no occlusion between the camera and the area, i.e., the camera may be able to capture the total area without any occlusion. The area may be slightly occluded if there are only small parts or a small percentage of the area occluded, for example less than 5%, 10%, or up to 20% of the total area. The time fused occupancy class prediction may be a combination of the occupancy class and a previously identified occupancy class. The presently identified occupancy class may be determined or predicted at a present point of time and the previously identified occupancy class may be determined or predicted at a previous point of time. The previous point of time may be immediately before the present point of time (in other words: no further point of time is between the previous point of time and the present point of time) but is not restricted to this. It will be understood, that a discrete sequence of points in time may be used, for example equidistant points in time, for example a point of time every pre-determined amount of seconds, for example every second, or every 1/10 of a second (i.e., 100 ms) or the like. The presently identified occupancy class and the previously identified occupancy class may be combined by a fusion parameter. The fusion parameter may determine an impact of the presently identified occupancy class and the previously identified occupancy class to the time fused occupancy class prediction.

According to an embodiment, the selection of one of the plurality of modes may be provided from the first mode into the second mode, if the occlusion value for the present point of time is larger than a predetermined occlusion threshold, or from the second mode into the first mode, if the occlusion value for the present point of time is lower than the predetermined occlusion threshold; or from the second mode into the third mode, if the second mode has been selected for a period of time longer than a predetermined blocking time threshold; or from the third mode into the first mode, if a time fused occlusion value is lower than the predetermined occlusion threshold; or from the third mode into the last mode, if a stable state of one of the plurality of occupancy classes is not reached for a predetermined occlusion time threshold, no occupancy class reaches an increased confirmation threshold for the predetermined occlusion time threshold, or the occupancy class may constantly change for the predetermined occlusion time threshold; or from the last mode into the third mode, if a stable state of one of the plurality of occupancy classes is reached or a user may confirm a change of the presently identified occupancy class; or from the last mode into the first mode, if the time fused occlusion value is lower than the predetermined occlusion threshold. A stable state of one of the plurality of occupancy classes may be reached if there is no occupancy state change for a time period of a pre-determined length, e.g., 30 s up to 5 min. The pre-determined length may be the occlusion time threshold.

The selection of the modes may be a switch of the modes or a change of the modes, wherein the switch or change may be dependent on the occlusion value and/or time parameters. The time parameters, for example a blocking time interval or a predetermined blocking time threshold, may be a period of time that indicates how long a current mode may be valid until the switch to another mode will occur. The predetermined occlusion threshold may determine an occlusion value that may describe a visibility of the area, which may be necessary to predict the occupancy class in the first mode. The predetermined occlusion threshold may be determined statistically such that the performance for occluded examples below the predetermined occlusion threshold may not be significantly worse than for not occluded cases of the method described herein. The predetermined occlusion threshold may be expressed as a numeric value, wherein the numeric value may describe how much of the area may be occluded and the numeric value may be dependent on how well the method described herein may perform on occluded cases and on the position of the occlusion in the area. The larger the occlusion value, the lower may be the visibility of the area. In the first mode the occupancy class prediction may be based on the time fused occupancy class prediction as described herein.

The second mode may be a mode where short timed critical occlusion scenarios may be handled in such a way that no time fused occupancy class prediction may be determined and no occupancy state changes may take place. The second mode may be the current mode for only a short time instance, i.e., the blocking time interval may be a short time instance, e.g., a few seconds, until a mode change or switch of the mode may occur. The time instance or the blocking time interval of the second mode may be determined by the predetermined blocking time threshold, in other words the predetermined blocking time threshold may define how long the occupancy class prediction may stay in the second mode.

In the third mode, which follows the second mode if the blocking time interval is larger than the predetermined blocking time threshold, a predetermined occupancy class "object" and a predetermined occupancy class "empty seat" may be combined to one class. In the third mode the occupancy class prediction may try to reach a stable occupancy state of one of the plurality of occupancy classes despite a longer lasting critical occlusion. The stable occupancy state may be a state where an occupancy class may be clearly determined by the method described herein.

The last mode may be the current mode, if the method described herein is not able to determine a stable occupancy state of the predetermined occupancy class in a predetermined occlusion time threshold. The predetermined occlusion time threshold may be a configurable time interval or a continuing time period to control how fast the system may need to react in occluded cases, e.g., 30 s or up 5 min. The predetermined occlusion time threshold may be dependent on different driving scenarios (for example, a speed or steering angle, or whether a lane change is currently taking place, or whether the vehicle is driving autonomously or not) and/or on a confidence value before the occlusion, for example, a high confidence value may lead to a larger predetermined occlusion time threshold. Also, the last mode may be the current mode, if no occupancy class reaches an increased confirmation threshold for the predetermined occlusion time threshold. The increased confirmation threshold may be a predetermined value of one of the plurality of occupancy classes that indicate a reliable determination of the respective occupancy class. In the last mode there may be help required, for example from the driver of the passenger car. The driver may be asked to remove the occlusion or the driver may have to verify an occupancy state change. The occupancy state change may be a change or a switch of a current occupancy class of one of the plurality of occupancy classes to a different from the current occupancy class of one of the plurality of occupancy classes.

According to an embodiment, the predetermined occlusion threshold may depend on the occupancy class for the present point of time.

According to an embodiment, the method further comprises the following step carried out by the computer hardware components: determining a condition of the vehicle, wherein selecting one of the plurality of modes is based on the condition of the vehicle. The condition of the vehicle may describe a driving scenario, for example, the vehicle is driving, the vehicle drives through a curve or on a highway, the vehicle is standing at a traffic light or the condition of the vehicle may describe a beneficial situation, for example the driver is not busy or focused on the traffic.

According to an embodiment, the occlusion value may be determined based on the measurement data and characteristics related to a relevant region. The measurement data may be determined based on data from a camera system. The camera system may comprise one camera or a plurality of cameras. Measurement data recorded by the camera system may be used to detect RGB (red green blue) information, e.g., identify objects, persons, child seats, an interior of a vehicle, in particular seat regions of a vehicle, or infrared (IR) images which may be less sensitive to varying lighting conditions (for example, at night time) and the measurement data may have high resolution, e.g. 1920×1080 pixels. The camera system may be mounted in the interior of a passenger car and directed to the rear end of the passenger car. The characteristics to the relevant region may describe properties of the region that specify an influence of an occlusion in the region to the occupancy class prediction. Further, the characteristics may be determined for each pixel of a plurality of pixels of the region. The relevant region may be a part of the area of the measurement data or may be the area of the measurement data.

According to an embodiment, the method further comprises the following step carried out by the computer hardware components: determining characteristics related to a relevant region for the occupancy class for the present point of time of the area from a plurality of characteristics for each possible predetermined occupancy class of a plurality of predetermined occupancy classes; and wherein the occlusion value is determined based on the measurement data and the determined characteristics related to the relevant region.

In another aspect, the present disclosure may be directed at a computer-implemented method for occlusion value determination, the method comprises the following steps performed (in other words: carried out) by computer hardware components: determining for a plurality of points of time measurement data related to an area; determining for a plurality of points of time characteristics related to a relevant region for a occupancy class for a present point of time of the area from a plurality of characteristics for each possible predetermined occupancy class of a plurality of predetermined occupancy classes; and determining for the present point of time an occlusion value based on the measurement data for a present point of time and the determined characteristics for a present point of time related to the relevant region. The plurality of characteristics for each possible predetermined occupancy class of a plurality of predetermined occupancy classes class may be determined in advance for each of the predetermined occupancy classes.

According to an embodiment, the characteristics related to the relevant region may depend on the presently identified occupancy class for a present point of time. The characteristics related to the relevant region may comprise a weight mask, the weight mask may comprise a plurality of mask pixels, each mask pixel may correspond to a measurement pixel of the measurement data. The weight mask and respectively each of the plurality of mask pixels may determine the impact of each of the plurality of measurement pixels to the occupancy class prediction. Each of the mask pixels may be represented by a normalized scalar value, e.g., between 0 and 1. The larger the scalar value, the larger may be the impact of the mask pixel to the occupancy class prediction and vice versa.

According to an embodiment, an occlusion prediction may be determined based on the measurement data, a pixel segmentation or an object classification. The occlusion prediction may determine an occluded region of the measurement data. In other words, the occlusion prediction may estimate a region or a plurality of regions of the measurement data, where the area of the measurement data is occluded in that the area of the measurement data may not be visible. There may be different methods for determining the occlusion prediction. The methods may be divided in direct methods and indirect methods. The direct methods may determine the occlusion prediction by a pixel wise segmentation of the occluded region. In other words, each pixel of the occluded region may be characterized as occluded. The sum of all occluded pixels may define the occlusion prediction of the region. The indirect methods may be based on other computation modules, for example object detection algorithms or body part tracking methods. The occlusion prediction based on indirect methods may comprise all parts of the result of the object detection algorithm or the result of the body part tracking methods.

According to an embodiment, the predetermined occupancy classes may comprise at least two of the following: an empty seat, an object, a child seat, and a person. A combination of two of the predetermined occupancy classes may be possible, for example, the occupancy class empty seat E and the occupancy class object O may be combined to one class.

According to an embodiment, the area may comprise a seat region. The seat region may be a single seat of a passenger car, e.g., the middle rear seat of a car, the driver's seat, the co-driver's seat of a car, or the rear seat bench of a car.

In another aspect, the present disclosure may be directed at a computer system. The computer system may comprise a plurality of computer hardware components configured to carry out several or all steps of the computer-implemented methods described herein.

The computer system may comprise a plurality of computer hardware components (for example, a processor, for example processing unit or processing network, at least one memory, for example memory unit or memory network, and at least one non-transitory data storage). It will be understood that further computer hardware components may be provided and used for carrying out steps of the computer-implemented methods in the computer system. The non-transitory data storage and/or the memory unit may comprise a computer program for instructing the computer to perform several or all steps or aspects of the computer-implemented methods described herein, for example using the processing unit and the at least one memory unit.

In another aspect, the present disclosure may be directed to a vehicle, comprising the computer system described herein and a sensor, wherein the measurement data may be determined based on an output of the sensor. The sensor may be a camera.

In another aspect, the present disclosure is directed at a non-transitory computer readable medium comprising instructions for carrying out several or all steps or aspects of the computer-implemented methods described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented methods described herein.

BRIEF DESCRIPTION OF THE DRAWINGS

Example embodiments and functions of the present disclosure are described herein in conjunction with the following drawings, showing schematically.

DETAILED DESCRIPTION

Figure 1:
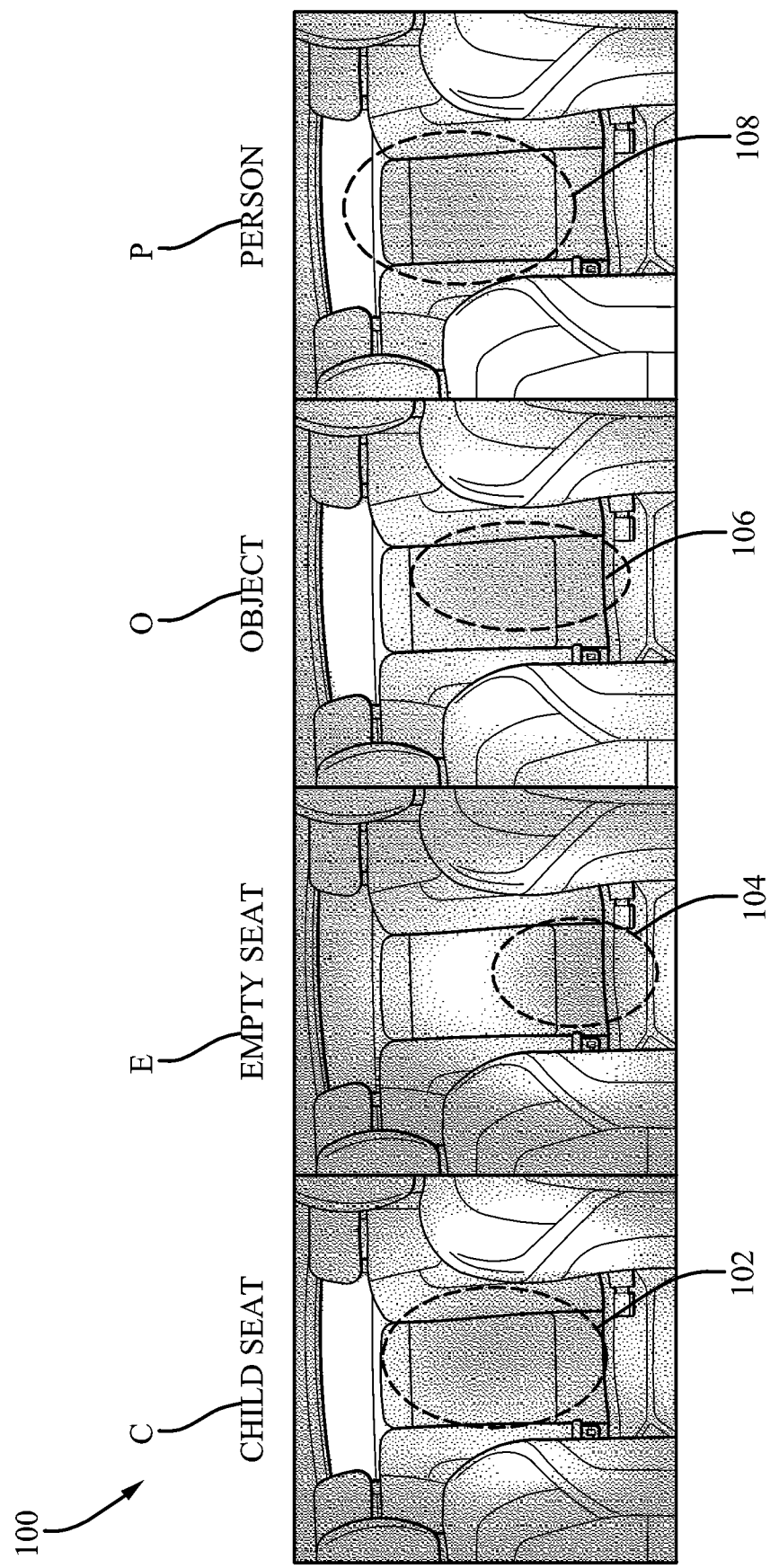
FIG. 1 illustrates characteristics related to a relevant region for predetermined occupancy classes: child seat, empty seat, object and person.

The present disclosure may be directed to a process chain for handling occluded seat regions for occupancy class prediction, such as for occupancy class detection in a vehicle. Implementations of the present invention and its operation are hereinafter described in detail for the rear middle seat of a passenger car, which may be mainly affected by occlusion, but may be applied to other seats or seat regions and/or other vehicles like trucks.

Cabin view cameras for example may be able to replace traditional sensors and may offer a wide range of additional possibilities, for example improved airbag control by detecting child seats, reliably distinguishing persons from heavy objects, driver distraction detection, driver drowsiness detection, detecting forgotten objects in the car or gesture-controlled applications.

An essential foundation for most applications may be a reliable seat occupancy classifier which may assign a seat occupancy state for each seat. Seat occupancy classification systems may use common methods for object detection or person detection: image classification; object detection approaches; body keypoint detection; semantic segmentation; and/or a combination of several approaches to combine some advantages. As the seat occupancy state may be used for safety critical applications, the tolerance for classification errors should be close to zero.

If the camera is placed in the front (rear facing), especially the rear seats may often be occluded by persons or objects from the front seats or adjacent rear seats. Occlusion problems may also occur for other camera positions in a similar way. Occlusions may likely reduce the system performance, for example either because the visibility of the actual seat occupancy class may be reduced or because the occluded object may be confused with another (e.g., wrong) seat occupancy class. The risk of misclassifications may depend on how much is occluded and whether the actual seat occupancy class may be still recognizable. A possible solution may be to treat occluded frames as blocked, for example, if occlusion is detected in the running system the respective frames may be ignored and the seat occupancy state may not be updated. Even though this may prevent occlusion related classifier errors, it may cause the system to be blocked for a very long time and miss significant state changes.

In order to make use of partially occluded areas while minimizing the risk of occlusion related classification errors, a cascade structure with for example four different modes may be provided. The first mode (which may be named as regular mode 602) may deal with fully visible and slightly occluded areas only. Short timed critical occlusion scenarios may be handled in the second mode (which may be named as short-term occlusion mode 604). In the third mode (which may be named as long-term occlusion mode 606), the system may try to reach a stable state of one of a plurality of occupancy classes despite longer lasting critical occlusion. The last mode (which may be named as Human Machine Interface HMI occlusion mode) may include a module which may seek assistance from the passengers if the system is unable to reach a stable state during longer lasting occlusion scenarios. Changes between the modes may depend on how much of the area is occluded, how long the occlusion may be present and the reliability of the predicted occupancy class.

Essential for handling occlusion may be to know the impact from different parts of the seat to the occupancy class determination. For this purpose, a weight mask may be generated as part of a training process for a plurality of predetermined occupancy classes, where the weight mask may include a plurality of mask pixels and each mask pixel may correspond to a measurement pixel of the measurement data. Each of the mask pixels may be weighted based on the relevance for the occupancy class prediction. The mask pixels may define characteristics related to a relevant region of the measurement data. The weight masks may be created separately for each possible predetermined occupancy class of the plurality of predetermined occupancy classes, which may allow occupancy class dependent differences. For example, persons or child seats may be reliably classified if a lower part of the middle seat or another seat region of a passenger car is occluded, whereas for detecting an empty seat of a passenger car, it may be essential to have a visible seat region of passenger car. For creating the pixel weights of the weight masks, a classifier trained on clean data without occlusion may be used.

Figure 4:
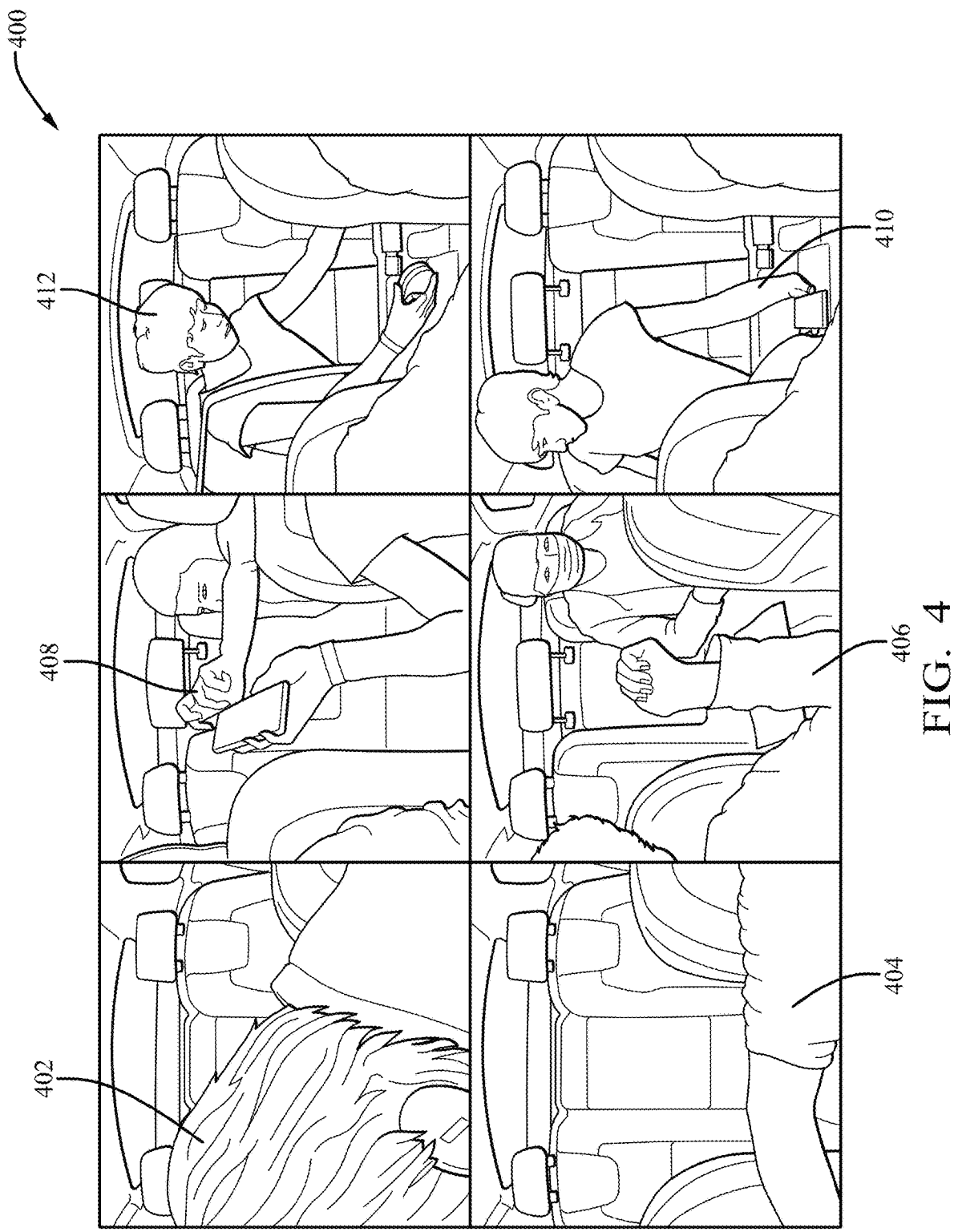
FIG. 4 illustrates occlusion examples of a camera view on a given seat.

FIG. 1 shows characteristics related to a relevant region 102, 104, 106, 108 for predetermined occupancy classes respectively, visualized on top of an empty seat. The predetermined occupancy classes may be for example a child seat C, an empty seat E, an object O, and a person P. A camera may be placed in the front (rear facing) of the passenger car to monitor especially the rear seats that may often be occluded by persons P or objects O from the front seats or adjacent rear seats (as shown in FIG. 4). The relevant region 102, 104, 106, 108 may depend on the predetermined occupant class. In FIG. 1 the relevant region 102 for a child seat C, the relevant region 104 for an empty seat E, the relevant region 106 for an object O and the relevant region 108 for a person P are identified by a dotted line, respectively. FIG. 1 shows an example how the weight masks may look like. In this example, the Grad-CAM (gradient-weighted class activation mapping) method was used to highlight image parts where the classifier is looking at in order to decide for a predetermined occupancy class. A combined weight map may be created by calculating the average over all training examples for each predetermined occupancy class.

Figure 2:
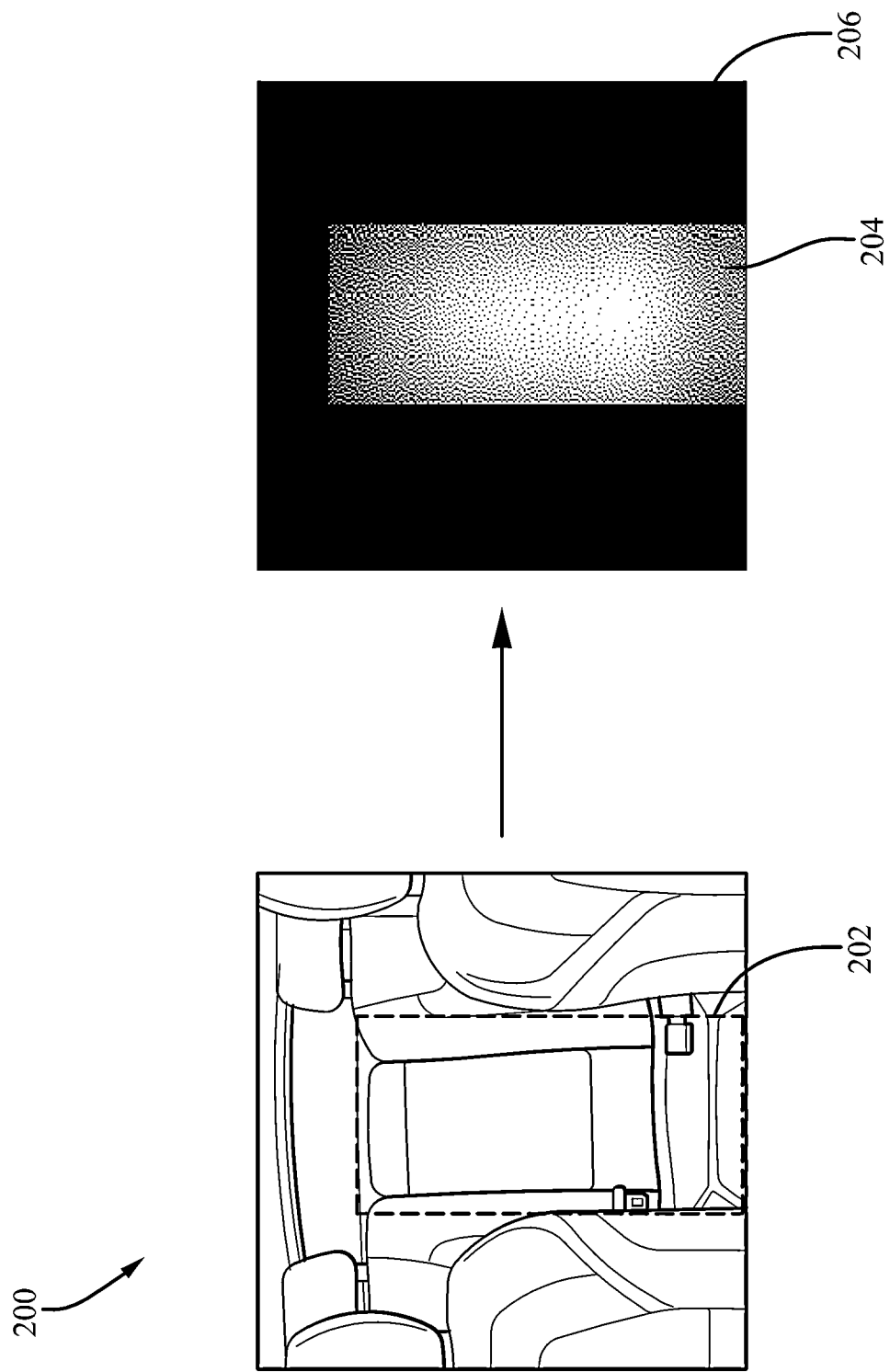
FIG. 2 illustrates relevant region and corresponding characteristics related to the relevant region.

FIG. 2 shows a relevant region on the left side of FIG. 2 and corresponding characteristics 204 related to the relevant region on the right side of FIG. 2. The relevant region is identified by a frame 202. The corresponding characteristics 204 related to the relevant region on the right side may be scaled for visualization. Characteristics 204 or weights may only be estimated or calculated for the relevant region. Other parts of the area 206, exclusive the relevant region, may not be labeled by characteristics 204 or weights and are represented in black color in FIG. 2.

Alternatively, the weight mask and thus the characteristics 204 of one of a plurality of predetermined occupancy classes may be created by training a classifier on clean data and evaluating the classifier performance on occluded examples. In this case, higher weights indicate areas where occlusion statistically may lead to a reduced classifier performance. The weight mask may be normalized so that the sum of all pixels in the weight mask is equal to 1.

Figure 3:
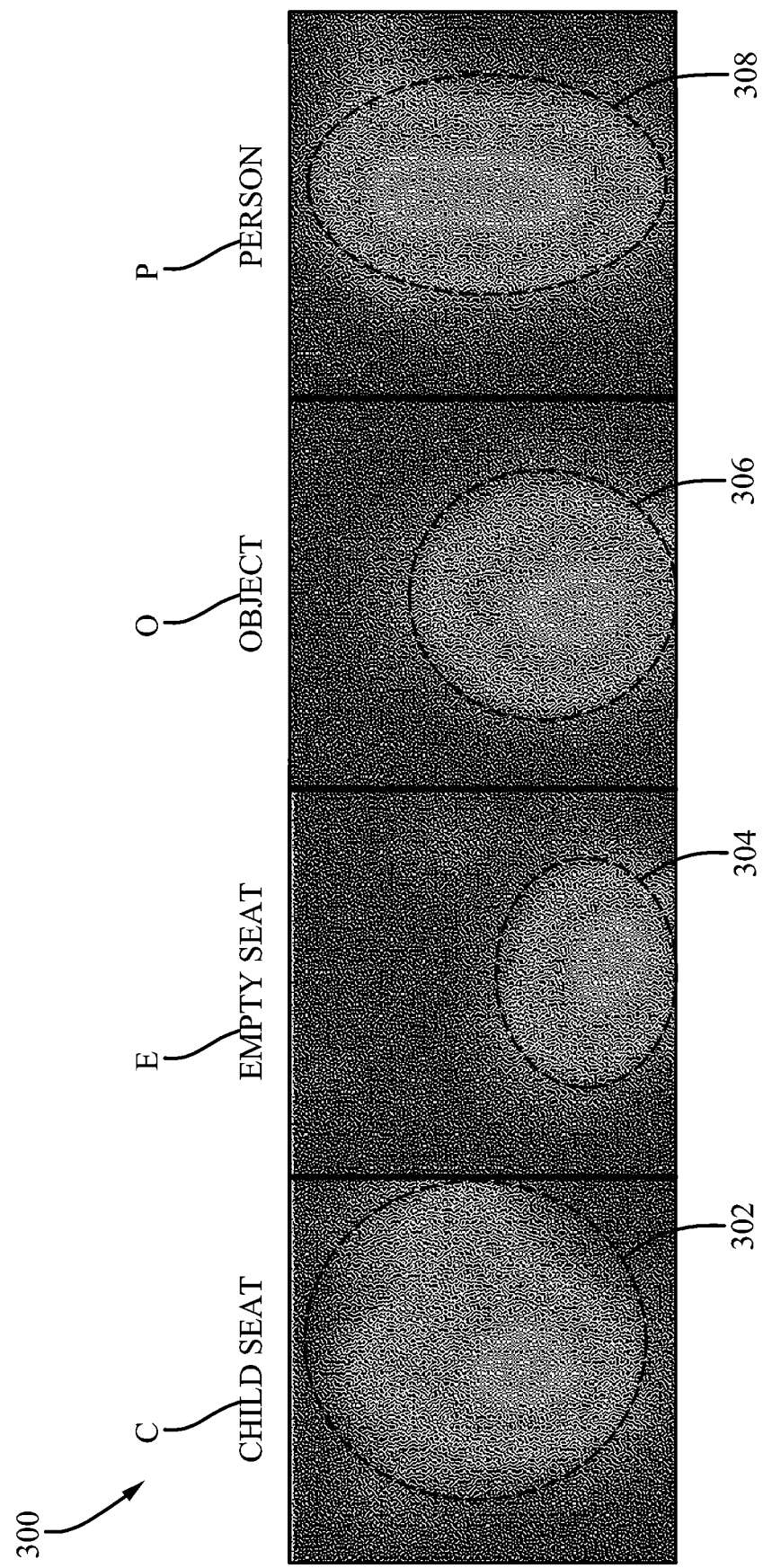
FIG. 3 illustrates weight masks for predetermined occupancy classes: child seat, empty seat, object, and person.

Occlusion may be simulated by blackening random parts of the images before running the classifier. The reduction of the occupancy classification result compared to the unoccluded (in other words: free of an occlusion) case may be used as measurement for the impact of the occlusion. All occluded pixels of this image may be weighted with the calculated value of the procedure described before. After doing this for each example, the weight mask may be created by calculating the mean over all examples and then normalizing over the relevant region. FIG. 3 again shows weight masks for the predetermined occupancy classes child seat C, empty seat E, object O, and person P. The intensity of the weight mask determines the impact of the occlusion for the occupancy class prediction. The higher the intensity (i.e., higher weights), the lower the classifier performance if an occlusion is determined in the region with high intensity of the weight mask. A region of intensity 302, 304, 306, 308 is shown in FIG. 3 for each of the predetermined occupancy classes child seat C, empty seat E, object O and person P. The region of intensity 306 of an object O may represent for example a smaller region compared to the regions of intensity 302 of a child seat C, or compared to the regions of intensity 308 of a person P, since a small object O may be harder to identify than a child seat C or a person P. The region of intensity 304 of an empty seat E may be the smallest region compared to the region of intensity 302 of a child seat C, the region of intensity 306 of an object O or the region of intensity 308 of a person P, since it has to be secured that the seat is really not occupied also by very small parts like mobile phones or the like.

There may be various ways how the camera view on a given seat may be occluded. FIG. 4 shows occlusion examples of a camera view on a given seat. For example, a middle-seat may be occluded based on a head of a driver 402, or may be occluded based on an arm of a driver 404, or other body-parts of a driver (not shown in FIG. 4). Also, an occlusion based on an arm of a co-driver 406 and/or other body-parts of a co-driver (not shown in FIG. 4) may occur. Furthermore, an occlusion based on an object 408, for example a mobile phone or the like or an occlusion based on an object 408 and an occlusion based on body-parts of passengers (for example, a driver, a co-driver, or passengers on the rear seats) may lead to disturbance when determining an occupancy class. Furthermore, an occlusion based on body-parts like an arm of a rear-seat passenger 410 or an occlusion based on body-parts of a rear-seat passenger or based on an object 412 in the line-of-sight of the camera may influence the occupancy class prediction.

There may be several methods to detect and predict occlusions. There may be provided direct methods to estimate occlusions as well as indirect method based on other computation modules, for example object detection or body part tracking. Also, a combination of direct methods and indirect methods for occlusion prediction may be possible.

A pixel wise segmentation of occluded seat regions may be an example for a direct method to estimate occlusions. A segmentation module may be used to provide a pixel wise occlusion mask specifying occluded areas. The segmentation module may contain a segmentation network that may be trained on an annotated set of occluded images.

Parts of the seat may be marked as occluded if positively classified obstacles in line-of-sight, for example objects O or persons P, associated to another seat may partly cover the observed seat region. For example, if body keypoints from another seat are covering the observed seat region, the occluded region may be determined based on a skeleton model and expected aspect ratios for each body part. Regions in the image next to the body key points/joints or connecting lines of the skeleton model may be masked out as occluded. The influence area of the masking may be controlled via parameters, for example, one could use a thinner or thicker line to connect the body joints. The masking may further be weighted, e.g., with fading support the further away from the skeleton. Another example may be, if bounding boxes from another seat are covering the observed seat region, all pixels inside the bounding box may be marked as occluded. Also, object segmentation masks may be used to detect and predict occlusions. The pixels inside object segmentation masks from other seats may be marked as occluded.

Figure 5:
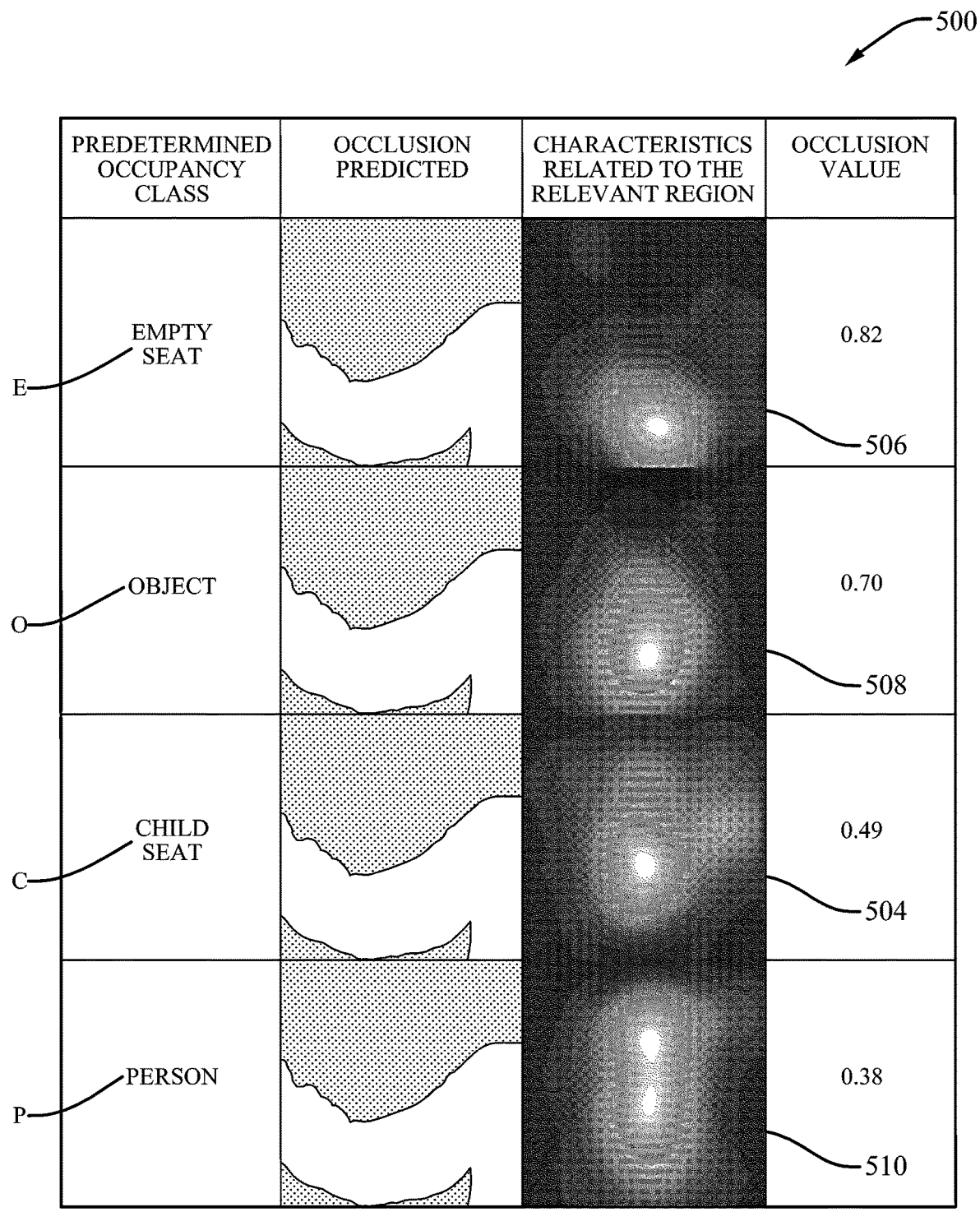
FIG. 5 illustrates occlusion values for an example occlusion prediction and different predetermined occupancy classes: child seat, empty seat, object, and person.

After an occlusion prediction 502 (as shown in FIG. 5) has been carried out, an occlusion value OCC may be determined based on the measurement data. The occlusion value OCC may be a scalar value and may estimate the occlusion impact to the occupancy class prediction. The occlusion value OCC may be calculated by:

$$OCC = \frac{\sum_{i=0}^{m-1}\sum_{j=0}^{n-1} \text{occlusion\_map}(i,j) \cdot \text{heatmap}(i,j)}{\sum_{i=0,}^{m-1}\sum_{j=0}^{n-1} \text{heatmap}(i,j)} \quad (1)$$

where i and j may denote pixel-coordinates of measurement data (like an image) with size i×j captured by the sensor.

The term occlusion_map(i,j) may be referred to as the occlusion prediction 502 and heatmap(i,j) may describe the characteristics of the relevant region. Therefore, the occlusion value OCC for one of a plurality of occupancy classes may be determined by a pixel wise multiplication of the occlusion prediction 502 (in other words: occlusion map)

and the mask pixels of the characteristics (in other words: heatmap) for a plurality of occupancy classes and normalization to the mask pixels of the characteristics for a plurality of occupancy classes. The occlusion value OCC may be proportional to the amount of occlusion of the seat region, where each pixel on the seat area may be weighted based on the predefined characteristics related to the relevant region in order to consider that occlusions of highly important image regions for the classification may be more critical than regions that may have almost no influence on the occupancy class prediction. The characteristics related to the relevant region may be obtained from the previous seat occupancy class.

FIG. 5 shows an example of occlusion value determination for an occlusion prediction 502, for example an arm of a driver, and the different predetermined occupancy classes: child seat C, empty seat E, object O, and person P. The occlusion value OCC for the predetermined occupancy class empty seat E may be estimated based on the equation 1 herein, viz. a pixel wise multiplication of the occlusion prediction 502 with the characteristics 506 related to an empty seat E and normalized to the characteristics 506 related to an empty seat E. The occlusion value OCC for the predetermined occupancy class object O may be estimated based on the equation 1 herein, viz. a pixel wise multiplication of the occlusion prediction 502 with the characteristics 508 related to an object O and normalized to the characteristics 508 related to an object O. The occlusion value OCC for the predetermined occupancy class child seat C may be estimated based on the equation 1 herein, viz. a pixel wise multiplication of the occlusion prediction 502 with the characteristics 504 related to a child seat C and normalized to the characteristics 504 related to child seat C. The occlusion value OCC for the predetermined occupancy class person P may be estimated based on the equation 1 herein, viz. a pixel wise multiplication of the occlusion prediction 502 with the characteristics 510 related to person P and normalized to the characteristics 510 related to a person P. The occlusion value OCC determination for the predetermined class empty seat E results in an occlusion value OCC of 0.82 for this example, since the occlusion prediction 502 overlaps a big area of the characteristics 506 related to an empty seat E. On the other side, the occlusion value determination for the predetermined class person P results in a comparatively low occlusion value OCC of 0.38 for this example, since the occlusion prediction 502 overlaps a small area of the characteristics 510 related to a person P.

The determined occlusion value OCC may then be used to determine a class dependent predetermined occlusion threshold TC, which may statistically indicate a significantly increased risk for classification errors. Considering the predetermined occupancy class may allow an occupancy class dependent behavior, for example that persons P or child seats C may often be still visible and may be correctly classified despite high occlusion value OCC, whereas empty seats E or objects O with occlusion may easily be misclassified, even if only a small part of the area may be occluded.

Figure 6:
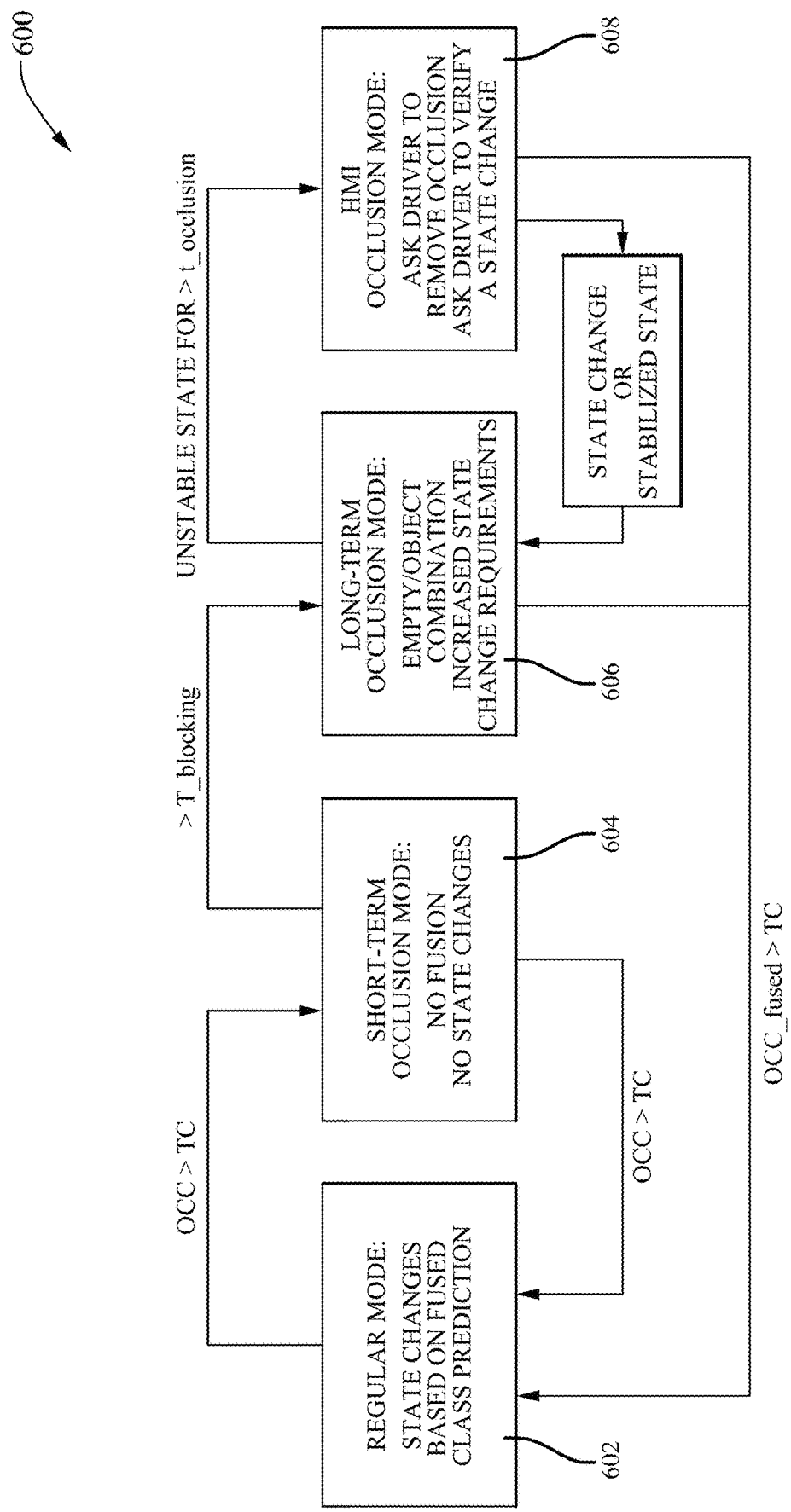
FIG. 6 illustrates a flow diagram illustrating the relationship between the modes for an occupancy class prediction based on the occlusion value.

Based on the occlusion value OCC, a mode for occupancy class prediction may be determined. There may be a plurality of different modes like a regular mode 602, a short-term occlusion mode 604, a long-term occlusion mode 606 and/or an HMI occlusion mode 608. In other words, there may be a state machine which may include four states where each state may represent an operation mode. The transitions between the states may depend on the occlusion value OCC, and/or time parameters and/or (in case of 608) a reliability of the predicted occupancy class result. FIG. 6 shows a flow diagram illustrating the relationship between the modes for an occupancy class prediction based on the occlusion value OCC.

The regular mode 602 may be the default mode for fully visible and slightly occluded frames of the measurement data. In this mode, state changes between for example the four occupancy classes empty seat E, object O, child seat C and person P may be done based on the time fused seat occupancy class predictions.

Another mode may be the short-term occlusion mode 604. The system switches from the regular mode 602 to short-term occlusion mode 604 once a visibility value, in particular the occlusion value OCC, exceeds a critical predetermined occlusion threshold TC. If the occlusion value OCC drops below the predetermined occlusion threshold TC, the system switches back to regular mode 602. In short-term occlusion mode 604, frames of the measurement data may be ignored completely and the processing results may not be considered in the time fusion at all. State changes of the seat occupancy classes may not be possible in the short-term occlusion mode 604. The short-term occlusion mode 604 may be active only for a predetermined period of the time the short-term occlusion mode 604 has been selected. This predetermined period of time may also be called as a blocking time interval TB and may be only a short-time interval, e.g., a few seconds. The blocking time interval TB may be parameterized and adjusted based on a given application to reflect the acceptable delay of a status update. If the blocking time interval TB is exceeded, the system switches to the long-term occlusion mode 606.

In the long-term occlusion mode 606, the processing results may be used again in a fusion step to update the output, i.e., the occupancy state prediction over time. However, the approach may be changed compared to the regular mode 602. For example, requirements for state changes may be increased by raising the corresponding thresholds for the time fused occupancy class prediction. The probability for the predicted occupancy class being correct may strongly exceed the probability for occlusion-based classification errors. Furthermore, in the long-term occlusion mode 606, the class empty seat E and the class object O may be combined to one class in order to ensure the classifier performance for the more essential classes person P and child seat C. For switching back to regular mode 602, a time fused occlusion value TOCC may be calculated. This may be mainly important to prevent immediate seat occupancy class changes in regular mode 602 after single frames of the measurement data with high visibility. In another embodiment, a hysteresis may be applied for the time fused occlusion value TOCC. The system may switch to the HMI occlusion mode 608 if no clear output, i.e., an unstable occupancy class, is reached. The unstable occupancy class may be defined in that several occupancy classes are equally likely, and/or no occupancy class reaches the increased confirmation threshold in the long-term occlusion mode 606, or the output result, i.e., the occupancy class prediction may be constantly changing within consecutive frames of the measurement data for a configurable time interval.

The HMI occlusion mode 608 may be processed if the system is unable to reach a stable occupancy class prediction for a longer time period, e.g., 30 s up to 5 min. The HMI occlusion mode 608 may be terminated and the system may switch back to the long-term occlusion mode 606 if a state change has been confirmed by the driver via a human machine interface or a stable state of one of the plurality of occupancy classes is reached. A stable state of one of the plurality of occupancy classes may be reached if there is no occupancy state change for a time period of a pre-determined length (for example, as indicated by the occlusion time threshold), e.g., 30 s up to 5 min. In the HMI occlusion mode 608, the human machine interface may communicate with the driver to either eliminate the source of the occlusion or give feedback on the current occupancy state, for example a current seat occupancy state. This interface may be intended to provide the following functions: further specify the type of occlusion (for example, which parts are occluded, the direction the occlusion comes from or whether it comes from an object or body parts) by an additional module and may use the result to request the driver to remove the source of occlusion; the driver may be asked to verify the new occupancy class before an occupancy class change (in other words: occupancy state change). The system may be able to provide various signals that may be used to steer the dialog with the driver and may enable to make the dialog interactive, for example, in combination with a smart assistant, including information what may be blocking the view (body part, object, something close to the camera, or lighting), information what may be the expected occupancy class, that cannot be confirmed due to the occlusion.

Examples for dialogue elements may include, "[w]elcome on board. I am having difficulty seeing if everyone is safely seated in the rear seats. Could you please assist me by", in one example, "moving your arm, shoulder, upper body to the side," "confirming there is a child seat (C), person (P), object (O) on the middle rear seat," and/or "unblocking my view." The user may then confirm the request via a voice command, body movements, and/or hand gestures.

The mode change or switch of the mode may be dependent on a vehicle condition. For example, the mode change or switch of the mode may only occur if the vehicle is standing, e. g. at a traffic light or stop sign, if the vehicle is driving or if the driver of the vehicle will not get distracted by the mode change or switch of the modes, e.g., during autonomous or semi-autonomous driving modes.

Especially, before switching to the HMI occlusion mode 608, it may be ensured that the interface can be applied safely without distracting the driver. This may for example be the case while the car is standing. Depending on the automation level of the car, it may further be applied in circumstances where the driver doesn't need to take other actions at the same time.

To increase the stability of the seat occupancy class prediction, the frame-based result may be stabilized over time, for example by a temporal filtering:

$$\text{class\_pred\_fused} = a * \text{class\_pred} + (1-a) * \text{class\_pred\_fused} \quad (2)$$

where equation 2 may be a formula for an exponential fusion and "a" may be a constant fusion parameter.

In a fusion step, the occlusion value OCC may be used while fusing the seat occupancy class prediction over time to reduce the influence of occluded frames of the measurement data. Frames of the measurement data with larger occlusion values OCC may have smaller influence on the fused result:

$$\text{class\_pred\_fused} = b * \text{class\_pred} + (1-b) * \text{class\_pred\_fused} \quad (3)$$

where b=a*(1−occlusion_value) may be a fusion parameter.

With this choice of fusion parameter, so for larger occlusion values, the class prediction from the current frame may have a smaller influence on the fused class prediction.

One problem for occupancy class prediction may be a decision between an object O and an empty seat E for occluded examples. The decision between a small object O and an empty seat E may be a hard case even in normal circumstances and may become especially difficult for occluded examples. Small objects O, like keys or mobile phones, may get occluded much more easily than persons P or child seats C. Similarly, even small occluded parts on an empty seat E may easily be mistaken as an object O. Hence, in long-term occlusion mode 606 the decision between an object O and an empty seat E may be omitted, in order to ensure the required performance on the other occupancy classes person P and child seat C, which may be considered more important.

For occluded frames of the measurement data, the fused occupancy class prediction for object O and empty seat E may be still calculated separately. However, in the state machine used to control the system state, the two occupancy classes object O and empty seat E may be considered as one class, with the classification result being the sum of both occupancy class predictions. In case of a state switch to this class, the system output, i.e., the occupancy class prediction, may indicate that both occupancy classes (object O or empty seat E) may be possible. If the previous occupancy class is object O or empty seat E, the occupancy class may be kept, if the corresponding occupancy class prediction may be higher than each of the others.

The HMI occlusion mode 608 may provide an interface to get assistance from the driver in case the system may be unable to provide a reliable prediction for the seat occupancy class. The following modules may be applied one after the other.

First, advices may be given to the driver on how to remove the source of occlusion. The goal of this module may be the removal of the occlusion by the driver based on a system indication. The driver should receive concrete information on what kind of occlusion needs to be removed. The module may need further steps to specify the kind of occlusion. Following functions may be provided, but may be replaced by different approaches.

If the occlusion was detected indirectly by body key points or an object detection output for other seats, the available information about the kind of occlusion may be used.

An additional classifier may be trained on a bunch of moderately or strongly occluded examples. The output of the additional classifier may specify from which of the other seats the occlusion comes and/or whether the occlusion may come from a body part or an object. The output of the additional classifier should include a confidence value in order to avoid giving incorrect indications.

Occlusion masks may be used to further specify the occluded area and/or to check whether the occluded area may be limited to specific parts of the seat, for example a seating area or backrest.

After the advices to the driver on how to remove the source of occlusion, a confirmation from the driver for a state change may be requested. The driver may be asked to verify the new state, i.e., the new occupancy class, before the state change will be carried out. The fused occupancy class prediction of a class confirmed by the driver may need to be increased by an additional confidence value to stabilize the result for future state changes.

The following example may show how occluded data with reduced influence on the occupancy class prediction may be added to a training set for a seat occupancy classifier with lower risk of reducing the performance. Examples with larger occlusion values OCC may have lower influence on the training compared to fully visible examples, consequently the failure tolerance for the seat occupancy classifier (during training) may be higher for larger occlusion values OCC. The occlusion value OCC may be calculated for each example in the training set based on a manually labeled occlusion mask and the characteristics to a relevant region (in other words: importance heatmaps) for the ground truth seat occupancy class.

By considering the occlusion value OCC during training, frames of the measurement data which are expected to have a lower influence on the occupancy class prediction may be already considered less important in training.

During classifier training, the occlusion value OCC may be used in a loss function to reduce the influence of the seat occupancy class prediction from occluded examples to the training loss. As an example, the following combined loss function for occlusion and seat occupancy classification task, may be defined:

Classification loss: crossentropy (pred_class);
Occlusion loss: crossentropy (pred_occlusion); and
Total loss: Occlusion loss+(1−occlusion_value)*classification loss.

The decision between object O and empty seat E during a convolutional neural network (CNN) training may be treated as follows: In case the ground truth occlusion is larger than the allowed threshold for regular mode 602, empty seat E and object O may be treated as the same class while calculating the classification loss. The values for both classes may be added to get the merged ground truth and prediction values.

Figure 7:
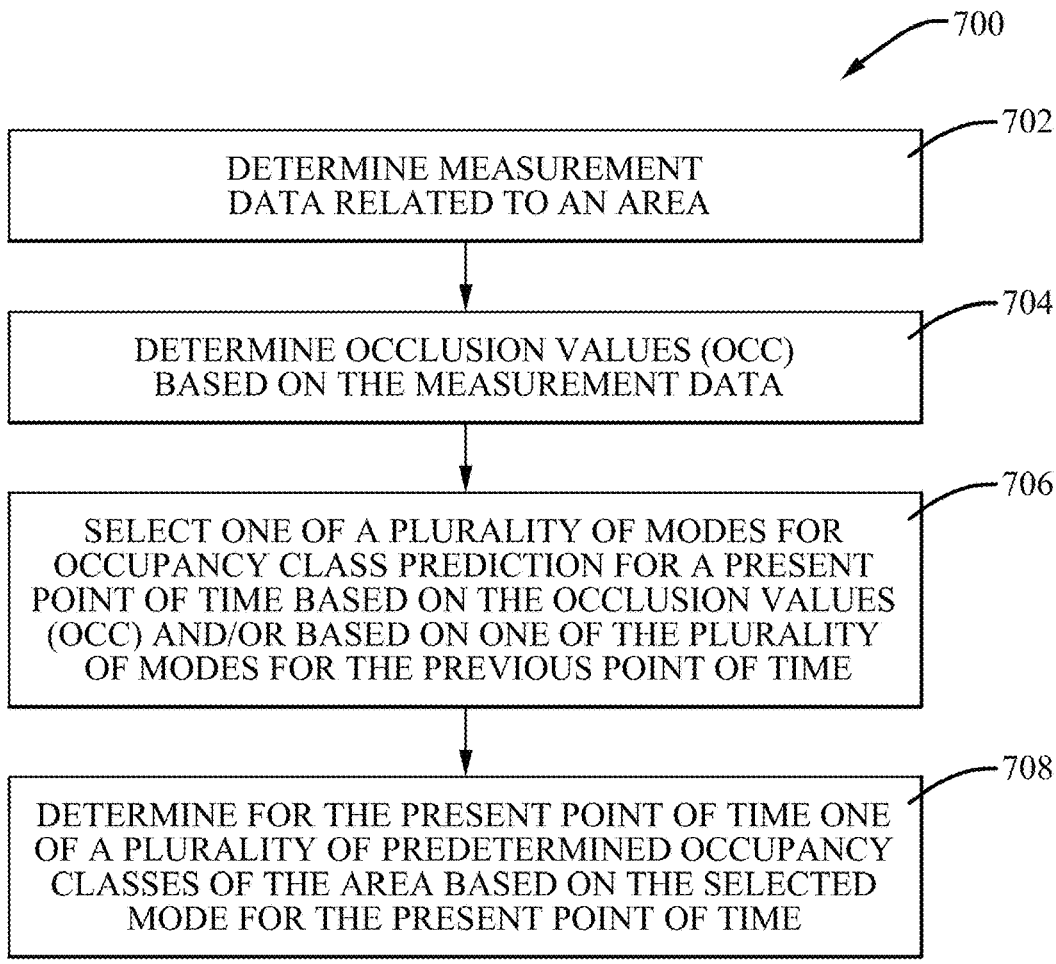
FIG. 7 illustrates a flow diagram illustrating a method for occupancy class prediction according to various embodiments.

FIG. 7 shows a flow diagram 700 illustrating a method for occupancy class prediction according to various embodiments. At 702, measurement data related to an area may be determined. At 704, occlusion values based on the measurement data related to the area may be determined. At 706, a plurality of modes for occupancy class prediction for a present point of time may be selected based on the occlusion value OCC and/or based on one of the plurality of modes for the previous point of time. At 708, one of a plurality of predetermined occupancy classes for the present point of time of the area may be determined based on the selected mode for the present point of time.

According to an embodiment, the plurality of modes comprises a first mode (for example, 602), a second mode (for example, 604), a third mode (for example, 606) and a last mode (for example, 608), wherein the first mode is selected if the area is fully visible or slightly occluded, the second mode is selected if there is a short-time critical occlusion in the area, the third mode is selected if there is a longer lasting critical occlusion in the area, and the last mode is selected if there is a longer lasting critical occlusion in the area and a stable state of one of the plurality of predetermined occupancy classes is not reached.

According to an embodiment, in the first mode 602 a change from an occupancy class for the present point of time to a different occupancy class of one of the plurality of predetermined occupancy classes may be based on a time fused occupancy class prediction.

According to an embodiment, the selection of one of the plurality of modes may be provided from the first mode 602 into the second mode 604, if the occlusion value OCC for the present point of time is larger than a predetermined occlusion threshold TC, or from the second mode 604 into the first mode 602, if the occlusion value OCC for the present point of time is lower than the predetermined occlusion threshold TC; or from second mode 604 into the third mode 606, if the second mode 604 has been selected for a period of time longer than a predetermined blocking time threshold TBT; or from the third mode 606 into the first mode 602, if a time fused occlusion value TOCC is lower than the predetermined occlusion threshold TC; or from the third mode 606 into the last mode 608, if a stable state of one of the plurality of occupancy classes is not reached for a predetermined occlusion time threshold TOT, no occupancy class reaches an increased confirmation threshold for the predetermined occlusion time threshold TOT, or the occupancy class is constantly changing for the predetermined occlusion time threshold TOT; or from the last mode 608 into the third mode 606, if a stable state of one of the plurality of occupancy classes is reached or a user confirms a change of the presently identified occupancy class; or from the last mode 608 into the first mode 602, if the time fused occlusion value TOCC is lower than the predetermined occlusion threshold TC.

According to an embodiment, the predetermined occlusion threshold TC may depend on the occupancy class for the present point of time.

According to an embodiment, the method further comprises the following step carried out by the computer hardware components: determining a condition of the vehicle, wherein selecting one of the plurality of modes is based on the condition of the vehicle.

According to an embodiment, the occlusion value OCC may be determined based on the measurement data and characteristics 204 related to a relevant region.

According to an embodiment, the method further comprises the following step carried out by the computer hardware components: determining characteristics 204 related to a relevant region for the occupancy class for the present point of time of the area from a plurality of characteristics 204 for each possible predetermined occupancy class of a plurality of predetermined occupancy classes; and wherein the occlusion value OCC is determined based on the measurement data and the determined characteristics 204 related to the relevant region.

According to an embodiment, the characteristics 204 related to the relevant region may depend on the presently identified occupancy class for the present point of time and/or the characteristics 204 related to the relevant region may include a weight mask 300, the weight mask 300 may include a plurality of mask pixels, each mask pixel may correspond to a measurement pixel of the measurement data.

According to an embodiment, an occlusion prediction 502 may be determined based on the measurement data, a pixel segmentation and/or an object classification.

According to an embodiment, the predetermined occupancy classes may include at least two of the following: an empty seat E, an object O, a child seat C and a person P.

Figure 8:
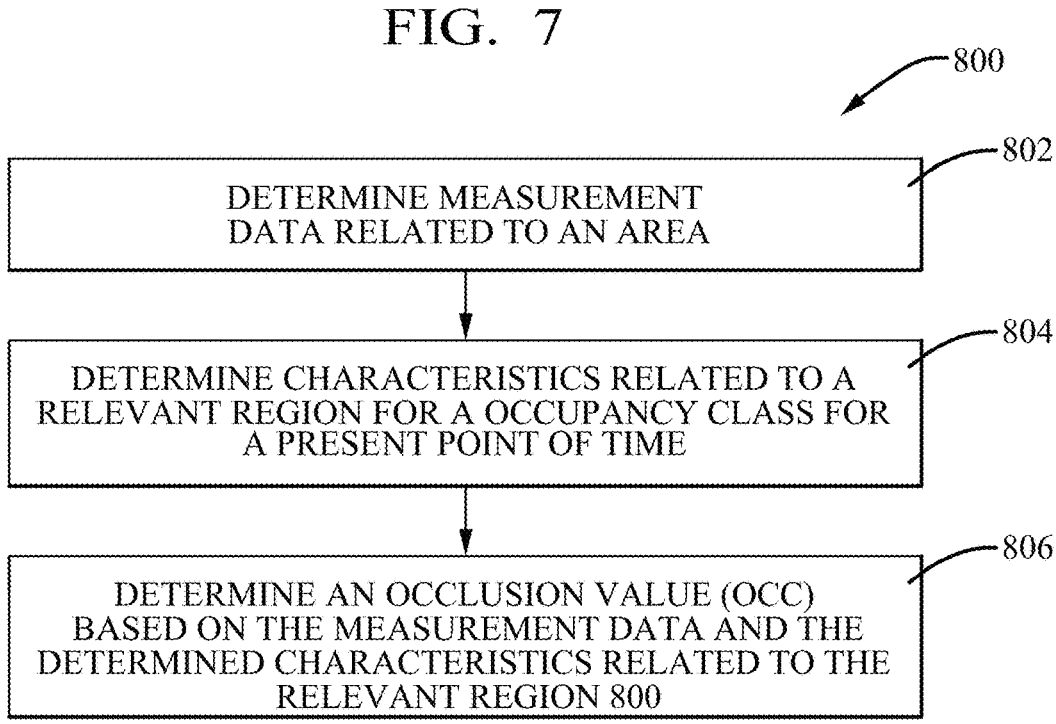
FIG. 8 illustrates a flow diagram illustrating a method for occlusion value determination according to various embodiments.

FIG. 8 shows a flow diagram 800 illustrating a method for occlusion value determination according to various embodiments. At 802, measurement data related to an area may be determined. At 804, characteristics 204 related to a relevant region for an occupancy class for the present point of time may be determined. At 806, an occlusion value OCC based on the measurement data and the determined characteristics 204 related to the relevant region may be determined.

Each of the steps 702, 704, 706, 708, 802, 804, 806, and the further steps described above may be performed by computer hardware components, for example as described with reference to FIG. 9.

Figure 9:
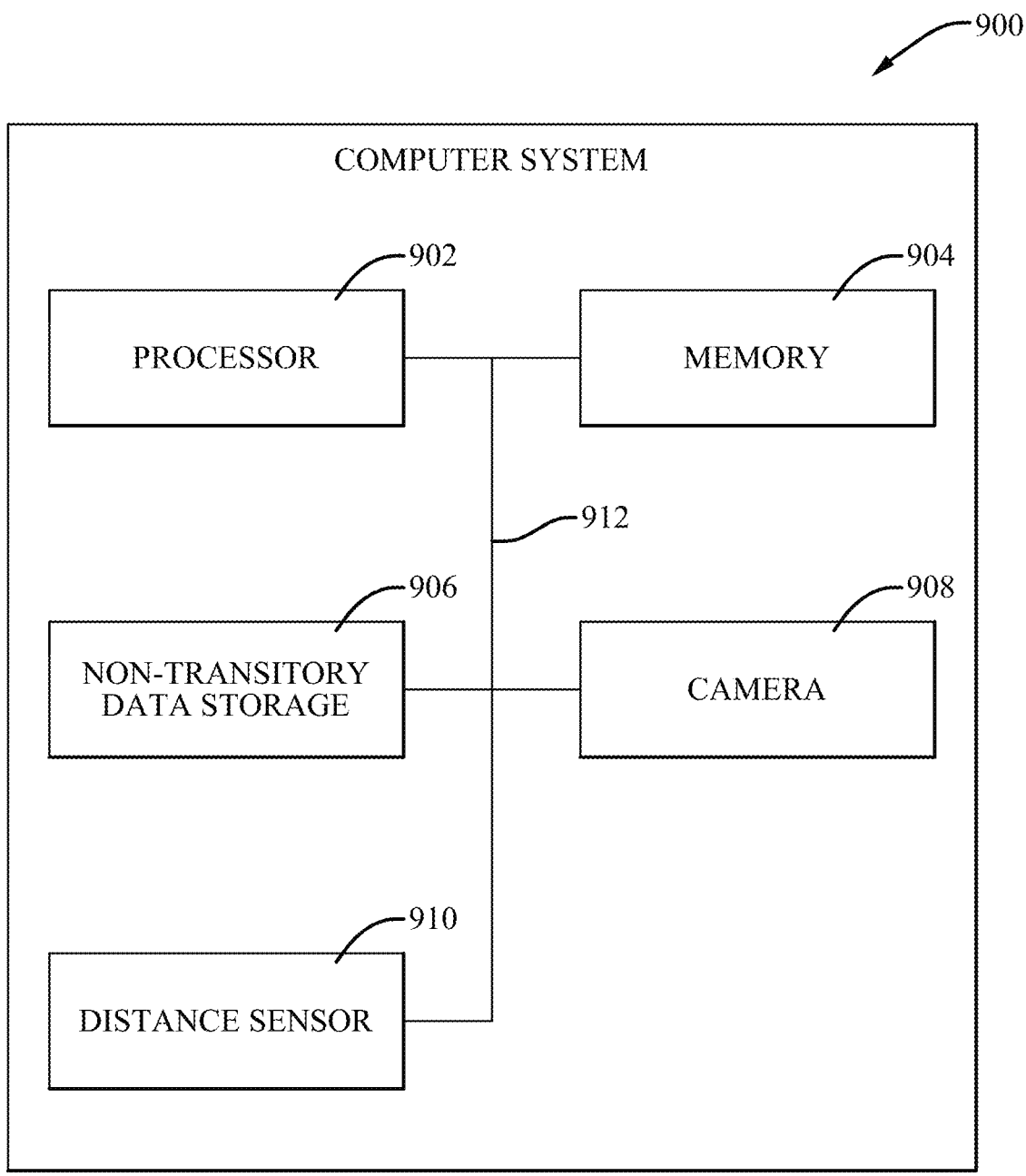
FIG. 9 illustrates a computer system with a plurality of computer hardware components configured to carry out steps of a computer-implemented methods for occupancy class prediction and for occlusion value determination according to various embodiments.

FIG. 9 shows a computer system 900 with a plurality of computer hardware components configured to carry out steps of a computer-implemented method for occupancy class prediction and/or of a computer-implemented method for occlusion value determination according to various embodiments. The computer system 900 may include a processor 902, a memory 904, and a non-transitory data storage 906. A camera 908 and/or a distance sensor 910 (for example, a radar sensor or a LIDAR sensor) may be provided as part of the computer system 900 (like illustrated in FIG. 9), or may be provided external to the computer system 900.

The processor 902 may carry out instructions provided in the memory 904. The non-transitory data storage 906 may store a computer program, including the instructions that may be transferred to the memory 904 and then executed by the processor 902. The camera 908 and/or the distance sensor 910 may be used to determine measurement data, for example measurement data that is provided to the methods as described herein.

The processor 902, the memory 904, and the non-transitory data storage 906 may be coupled with each other, e.g., via an electrical connection 912, such as e.g., a cable or a computer bus or via any other suitable electrical connection to exchange electrical signals. The camera 908 and/or the distance sensor 910 may be coupled to the computer system 900, for example via an external interface, or may be provided as parts of the computer system (in other words: internal to the computer system, for example coupled via the electrical connection 912).

The terms "coupling" or "connection" are intended to include a direct "coupling" (for example, via a physical link) or direct "connection" as well as an indirect "coupling" or indirect "connection" (for example, via a logical link), respectively.

It will be understood that what has been described for one of the methods above may analogously hold true for the computer system 900.

LIST OF REFERENCE CHARACTERS FOR THE ELEMENTS IN THE DRAWINGS

The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

E empty seat
C child seat
O object
P person
100 characteristics related to a relevant region for predetermined occupancy classes
102 relevant region of a child seat
104 relevant region of an empty seat
106 relevant region of an object
108 relevant region of a person
200 relevant region and corresponding characteristics related to the relevant region
202 frame
204 characteristics
206 other parts of an area
300 weight masks for predetermined occupancy classes
302 region of intensity of a child seat
304 region of intensity of an empty seat
306 region of intensity of an object
308 region of intensity of a person
400 occlusion examples of a camera view on a given seat
402 occlusion based on a head of a driver
404 occlusion based on an arm of a driver
406 occlusion based on an arm of a co-driver
408 occlusion based on an object
410 occlusion based on an arm of a rear-seat passenger
412 occlusion based on body parts of a rear-seat passenger or by an object
500 occlusion value determination for an example occlusion prediction and different predetermined occupancy classes
502 occlusion prediction
504 characteristics related to a child seat
506 characteristics related to an empty seat
508 characteristics related to an object
510 characteristics related to a person
600 flow diagram illustrating the relationship between the modes for an occupancy class prediction based on the occlusion value
602 first mode represented as a regular mode
604 second mode represented as a short-term occlusion mode
606 third mode represented as a long-term occlusion mode
608 last mode represented as a HMI occlusion mode
OCC occlusion value
TC predetermined occlusion threshold
TOCC time fused occlusion value
TB blocking time interval
TBT predetermined blocking time threshold
TOT predetermined occlusion time threshold
700 flow diagram illustrating a method for occupancy class prediction according to various embodiments
702 step of determining measurement data related to an area
704 step of determining an occlusion value based on the measurement data
706 step of determining a mode for occupancy class prediction based on the occlusion value
708 step of determining one of a plurality of predetermined occupancy classes of the area based on the mode
800 flow diagram illustrating a method for occlusion value determination according to various embodiments
802 step of determining measurement data related to an area
804 step of determining characteristics related to a relevant region for a presently identified occupancy class
806 step of determining an occlusion value based on the measurement data and the determined characteristics related to the relevant region
900 computer system according to various embodiments
902 processor
904 memory
906 non-transitory data storage
908 camera
910 distance sensor
912 connection

What is claimed is:

1. A method comprising:
for a plurality of points of time, determining measurement data related to an area;
for the plurality of points of time, determining occlusion values based on the measurement data;
for a present point of time, selecting one of a plurality of modes for occupancy class prediction based on one or more of (i) the occlusion values for at least one of the present point of time and a previous point of time and (ii) the plurality of modes for occupancy class prediction selected for the previous point of time; and
for the present point of time, determining one of a plurality of predetermined occupancy classes of the area based on a selected mode for the present point of time, the determining sufficient for occupancy class prediction; and wherein the plurality of modes comprises a first mode, a second mode, a third mode, and a last mode, wherein the first mode is selected if the area is fully visible or slightly occluded, the second mode is selected if there is a short-time critical occlusion in the area, the third mode is selected if there is a longer lasting critical occlusion in the area, and the last mode is selected if there is a longer lasting critical occlusion in the area and a stable state of one of the plurality of predetermined occupancy classes is not reached.

2. The method of claim 1, wherein in the first mode, a change from an occupancy class for the present point of time to a different occupancy class of one of the plurality of predetermined occupancy classes is based on a time fused occupancy class prediction.

3. The method of claim 2, wherein selecting one of the plurality of modes is provided:

from the first mode into the second mode, if the occlusion value for the present point of time is larger than a predetermined occlusion threshold;

from the second mode into the first mode, if the occlusion value for the present point of time is lower than the predetermined occlusion threshold;

from second mode into the third mode, if the second mode has been selected for a period of time longer than a predetermined blocking time threshold;

from the third mode into the first mode, if a time fused occlusion value is lower than the predetermined occlusion threshold;

from the third mode into the last mode, if a stable state of one of the plurality of occupancy classes is not reached for a predetermined occlusion time threshold, no occupancy class reaches an increased confirmation threshold for the predetermined occlusion time threshold, or the occupancy class is constantly changing for the predetermined occlusion time threshold;

from the last mode into the third mode, if a stable state of one of the plurality of occupancy classes is reached or a user confirms a change of a presently identified occupancy class; or from the last mode into the first mode, if the time fused occlusion value is lower than the predetermined occlusion threshold.

4. The method of claim 3, wherein the predetermined occlusion threshold depends on the occupancy class for the present point of time.

5. The method of claim 1, further comprising:
determining a condition of a vehicle; and
wherein selecting one of the plurality of modes is based on the condition of the vehicle.

6. The method of claim 1, wherein the occlusion value is determined based on the measurement data and characteristics related to a relevant region.

7. The method of claim 1, further comprising:
determining characteristics related to a relevant region for the occupancy class for the present point of time of the area from a plurality of characteristics for each possible predetermined occupancy class of a plurality of predetermined occupancy classes; and
wherein the occlusion value is determined based on the measurement data and the determined characteristics related to the relevant region.

8. The method of claim 1, further comprising:
for the plurality of points of time, determining characteristics related to a relevant region for an occupancy class for a present point of time of the area from a plurality of characteristics for each possible predetermined occupancy class of a plurality of predetermined occupancy classes; and
for the present point of time, determining an occlusion value based on the measurement data for the present point of time and the determined characteristics for the present point of time related to the relevant region, the determining sufficient for occlusion value determination.

9. The method of claim 8,
wherein the characteristics related to the relevant region depend on the occupancy class for the present point of time; or
wherein the characteristics related to the relevant region comprise a weight mask, the weight mask comprising a plurality of mask pixels, each mask pixel corresponding to a measurement pixel of the measurement data.

10. The method of claim 8, wherein an occlusion prediction is determined based on at least one of the measurement data, a pixel segmentation, or an object classification.

11. The method of claim 1, wherein the one of a plurality of predetermined occupancy classes comprise at least two of the following: an empty seat, an object, a child seat, or a person.

12. A method comprising:
for a plurality of points of time, determining measurement data related to an area;
for the plurality of points of time, determining occlusion values based on the measurement data;
for a present point of time, selecting one of a plurality of modes for occupancy class prediction based on one or more of (i) the occlusion values for at least one of the present point of time and a previous point of time and (ii) the plurality of modes for occupancy class prediction selected for the previous point of time;
for the present point of time, determining one of a plurality of predetermined occupancy classes of the area based on a selected mode for the present point of time, the determining sufficient for occupancy class prediction; and
for the plurality of points of time, determining characteristics related to a relevant region for an occupancy class for a present point of time of the area from a plurality of characteristics for each possible predetermined occupancy class of a plurality of predetermined occupancy classes; and
for the present point of time, determining an occlusion value based on the measurement data for the present point of time and the determined characteristics for the present point of time related to the relevant region, the determining sufficient for occlusion value determination.

13. The method of claim 12,
wherein the characteristics related to the relevant region depend on the occupancy class for the present point of time; or
wherein the characteristics related to the relevant region comprise a weight mask, the weight mask comprising a plurality of mask pixels, each mask pixel corresponding to a measurement pixel of the measurement data.

14. The method of claim 12, wherein an occlusion prediction is determined based on at least one of the measurement data, a pixel segmentation, or an object classification.

15. The method of claim 12, wherein the plurality of modes comprises a first mode, a second mode, a third mode, and a last mode, wherein the first mode is selected if the area is fully visible or slightly occluded, the second mode is selected if there is a short-time critical occlusion in the area, the third mode is selected if there is a longer lasting critical occlusion in the area, and the last mode is selected if there is a longer lasting critical occlusion in the area and a stable state of one of the plurality of predetermined occupancy classes is not reached.

16. The method of claim 15, wherein in the first mode, a change from an occupancy class for the present point of time to a different occupancy class of one of the plurality of predetermined occupancy classes is based on a time fused occupancy class prediction.

17. The method of claim 16, wherein selecting one of the plurality of modes is provided:

from the first mode into the second mode, if the occlusion value for the present point of time is larger than a predetermined occlusion threshold;

from the second mode into the first mode, if the occlusion value for the present point of time is lower than the predetermined occlusion threshold;

from second mode into the third mode, if the second mode has been selected for a period of time longer than a predetermined blocking time threshold;

from the third mode into the first mode, if a time fused occlusion value is lower than the predetermined occlusion threshold;

from the third mode into the last mode, if a stable state of one of the plurality of occupancy classes is not reached for a predetermined occlusion time threshold, no occupancy class reaches an increased confirmation threshold for the predetermined occlusion time threshold, or the occupancy class is constantly changing for the predetermined occlusion time threshold;

from the last mode into the third mode, if a stable state of one of the plurality of occupancy classes is reached or a user confirms a change of a presently identified occupancy class; or from the last mode into the first mode, if the time fused occlusion value is lower than the predetermined occlusion threshold.

18. The method of claim 17, wherein the predetermined occlusion threshold depends on the occupancy class for the present point of time.

19. The method of claim 12, further comprising:
determining a condition of a vehicle; and
wherein selecting one of the plurality of modes is based on the condition of the vehicle.

20. The method of claim 12, wherein the occlusion value is determined based on the measurement data and characteristics related to a relevant region.

* * * * *